Jan. 18, 1966    J. R. SPRAUL ETAL    3,230,105
METHOD AND APPARATUS FOR APPLYING A MATERIAL TO A BODY
Filed Oct. 2, 1961    2 Sheets-Sheet 1
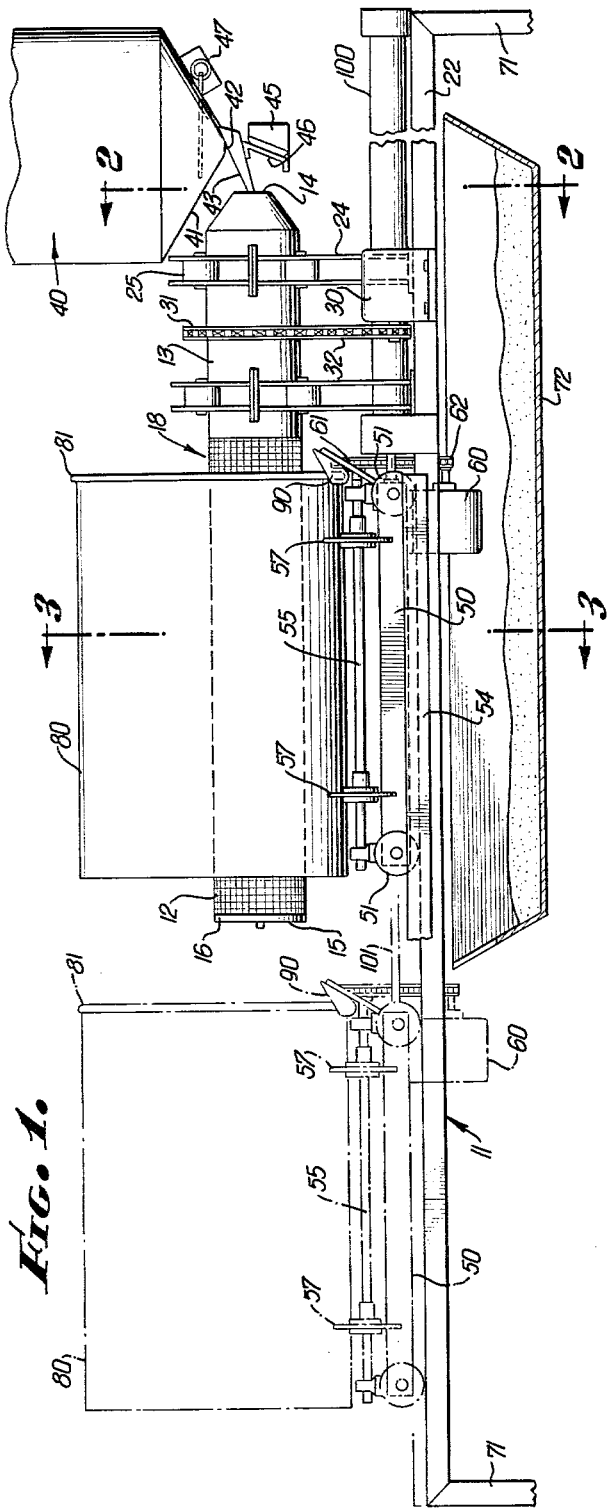
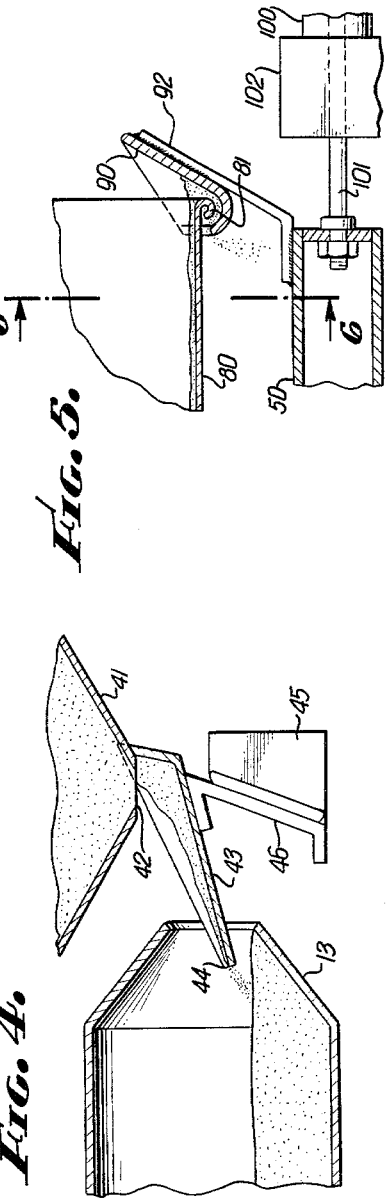
J. ROBERT SPRAUL
LELAND L. PEART
EVERETT A. GREER
INVENTORS.
BY *Huebner & Worrel*
ATTORNEYS.

J. ROBERT SPRAUL
LELAND L. PEART
EVERETT A. GREER
INVENTORS.

BY *Huebner & Worrel*
ATTORNEYS.

United States Patent Office 3,230,105
Patented Jan. 18, 1966

3,230,105
METHOD AND APPARATUS FOR APPLYING A MATERIAL TO A BODY
Joseph Robert Spraul, Palos Verdes Estates, Leland L. Peart, Newport Beach, and Everett A. Greer, Bell Gardens, Calif., assignors to Rheem Manufacturing Company, New York, N.Y., a corporation of California
Filed Oct. 2, 1961, Ser. No. 142,127
8 Claims. (Cl. 117—18)

This invention relates to a method and apparatus for applying a material to a body. It relates more particularly to a method and apparatus for applying a particulate material, such as a powdered resin or a metallic powder, to form a coating on the interior surfaces of a cylindrical body, and especially a metallic cylindrical body. A suggested use is in the application of a plastic resin or metallic coating to the interior of a metal shipping container, although many other uses will be apparent.

Metal shipping containers, such as black steel drums and pails, are used extensively for transporting and storing a wide variety of products, but their effective use can be greatly extended if the inside of such containers is coated with a material resistant to corrosive activities and reactions of products which cannot now be carried and stored in such drums because of such product activities and reactions. By way of example, presently it is not possible or practical to pack products with high acid activity qualities in black steel drums, and often excessively expensive drums, such as stainless steel drums, are used for such purposes. The application of the method and apparatus of the present invention to black steel drums will produce coated black steel drums at a cost far below the cost of stainless steel drums, and such coated drums will have corrosive-resistant characteristics commercially comparable, and often superior, to those of substantially more expensive stainless steel drums.

Various corrosive-resistant coatings have been applied by many methods, such as painting or dipping, to drums in order to build up the corrosive-resistant capacities of drums and pails, but many limitations have been encountered. For instance, several of the coating materials are relatively expensive. But more important are the considerations that such coatings are often inefficient in that they leave voids created by air bubbles or give an incomplete coverage of the entire interior surfaces of the drums to which they are applied; the coatings formed thereby are excessively thin; they often become brittle and break away from the drum body; and it is generally impossible or impractical to build up sufficiently dense coatings by repeated applications of layers of coatings.

The method and apparatus of the present invention, on the other hand, make it commercially feasible to apply quickly, easily, and relatively inexpensively, a single, firm, solid, complete coating of corrosive-resistant material to the internal surface of the body of a standard black steel shipping container, free of voids, in a single coating operation, so that the container so treated has all of the corrosive-resistant characteristics of containers of more expensive metals, such as stainless steel.

It is therefore an object of the invention to provide a method and apparatus for applying a resinous or metallic powder to the interior of a cylindrical body so as to form a solid coating thereon.

It is another object of the invention to provide a method and apparatus for applying such a coating to the interior of a cylindrical body so as to render said body resistant to corrosive activities and reactions of products packed therein.

It is still another object of the invention to provide a method and apparatus for applying such a coating of substantial thickness in a single application.

It is a further object of the invention to provide a method and apparatus for applying such a coating, which are relatively simple and readily adaptable for use in association with modern, high-speed steel container production lines.

With these and other objects in view, the invention consists of the construction, arrangement and combination of the various parts of the device whereby the objects contemplated are attained, as hereinafter set forth, pointed out in the appended claims, and illustrated in the accompanying drawings.

In the drawings:

FIGURE 1 is a side elevational view of the apparatus of the present invention.

FIGURE 4 is an enlarged cross-sectional view of a part of the apparatus showing the means of introducing and distributing the powder therein.

FIGURE 5 is an enlarged corss-sectional view of a part of the apparatus showing the means of applying the powder to a lip of a container to be coated.

Figure 2:
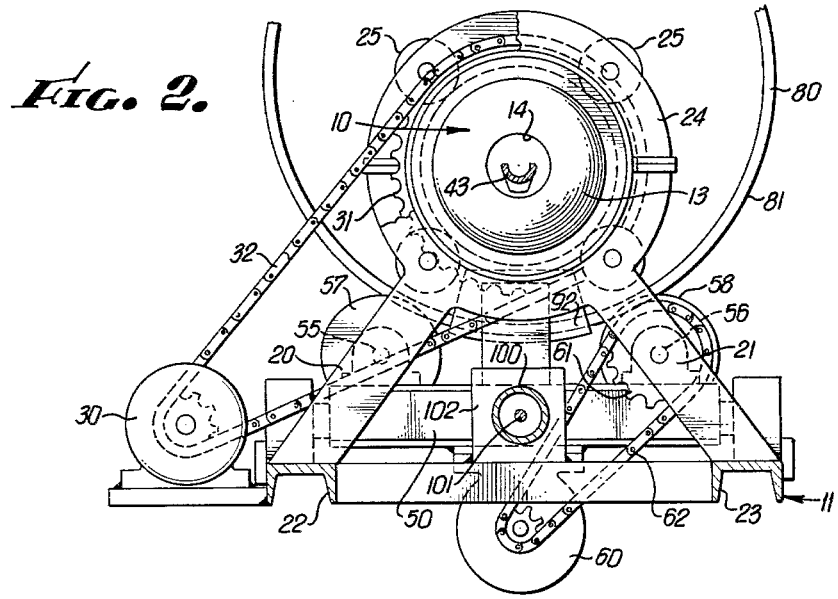
FIGURE 2 is an enlarged cross-sectional view taken on the line 2—2 of FIGURE 1.
Figure 3:
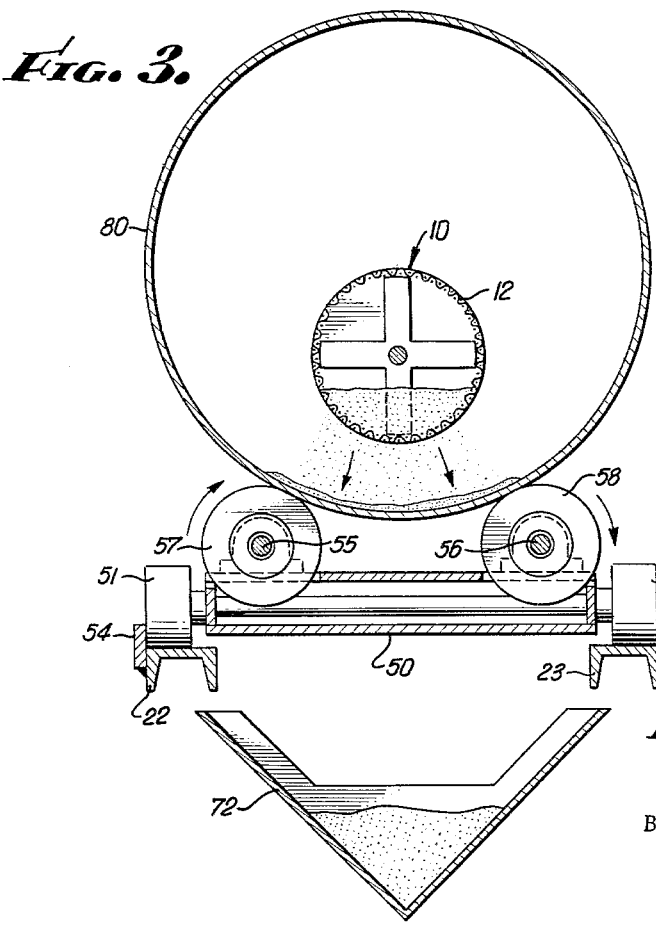
FIGURE 3 is an enlarged cross-sectional view taken on the line 3—3 of FIGURE 1.
Figure 6:
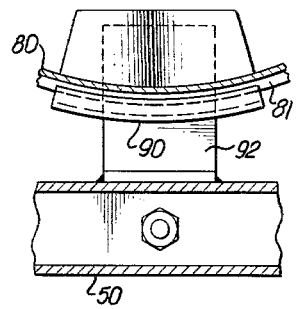
FIGURE 6 is a view taken on the line 6—6 of FIGURE 5.

A perforate screen member 10, preferably cylindrical in configuration, is rotatably mounted on a bed frame 11, and suspended above said bed frame 11, in substantially parallel relationship thereto.

Perforate member 10 is principally formed of a screen 12, but one end thereof may be formed of sheet material 13 so as to give added rigidity thereto and to form a suitable rotational mounting of said perforate member 10. In order to permit a cylindrical body to be treated, to be readily introduced into and removed from close proximity to screen 12, in the manner hereinafter described, the pivotal mounting of screen member 10 on bed frame 11 is preferably accomplished adjacent one end 14 of screen member 10, leaving the other end 15 of screen member 10 freely suspended.

End 15 of screen member 10 is closed, as by a cover 16, whereas, end 14 is open so as to serve as an intake for the powder to be introduced into screen member 10. It has been found advantageous to form open end 14 as a truncated cone so as to assist in the even distribution of the powder throughout the entire length of screen member 10, as hereinafter described.

Rotational mounting of screen member 10 on bed frame 11 may be accomplished by means of legs 20 and 21 mounted on side frame members 22 and 23, respectively, and in turn supporting a ring 24 surrounding screen member 10 and spaced apart therefrom. Rotatably mounted on said ring 24 are a series of rollers 25 which contact screen member 10 adjacent end 14 of screen member 10, preferably in contact with sheet material 13. In the preferred form of the invention shown in FIG. 1, two support assemblies of legs, a ring, and rollers are illustrated.

Power means, such as an electric motor 30, is mounted on bed frame 11. As shown in FIGURE 2, said power means 30 may be supported on said side frame member 22. A sprocket wheel 31 is mounted on screen member 10, adjacent end 14 thereof, and suitable drive means, such as an endless chain 32, is disposed between motor 30 and sprocket wheel 31, to impart rotational movement to screen member 10 when motor 30 is activated.

A hopper 40 is mounted to a suitable base in position above open end 14 of screen member 10. The bottom 41 of hopper 40 is funnel-shaped, and an opening 42 is provided in the bottom of funnel 41 so as to permit the ready flow of powder from hopper 40. A chute 43 is mounted on or adjacent to hopper 40, adjacent opening 42, and has a discharge end 44 projecting into open end 14 of screen member 10. Chute 43 may have attached thereto a vibrator, such as 45, by any suitable means, such as a bracket 46. It may also be desirable to place a second vibrator 47 in hopper 40 closely adjacent to opening 42 in bottom 41.

A carriage 50 is supported on side frame members 22 and 23 of bed frame 11 by rollers 51. Said rollers 51 permit the passage of carriage 50 along side frame members 22 and 23. Plates 54 may be mounted externally on side frame members 22 and 23 so as to form a track for rollers 51, and maintain carriage 50 on side frame members 22 and 23.

A pair of substantially parallel rotatable shafts 55 and 56 is mounted on carriage 50. Mounted on said shafts 55 and 56 are rollers 57 and 58, respectively said rollers 57 and 58 being designed to support the object to be coated in the manner hereinafter described.

One of said shafts 55 or 56, such as shaft 56, may be power driven, the power drive being accomplished by means of a motor, such as an electric motor 60, mounted on carriage 50; a sprocket wheel 61 mounted on shaft 56, and an endless chain 62 disposed between said sprocket wheel 61 and said motor 60.

Bed frame 11, which may be supported by legs 71 is open between side frame members 22 and 23. Suitably suspended from bed frame 11, between side frame members 22 and 23, is a trough 72.

If it is desired to use the method and apparatus of the present invention to internally coat the body of a steel shipping container, such as drum 80 illustrated in FIGURE 1, it is often desirable to apply the coating not only to the inside surface of the body of said container 80, but also to the outside surface of a curled lip 81, frequently a structural part of a container such as container 80. To accomplish this latter coating, a second trough 90 may be mounted on carriage 50 by any suitable means, such as a bracket 92, said second trough 90 being in position to receive lip 81 when container or drum 80 is in position on carriage 50 to be coated.

In operation, drum 80 is heated in an oven (not shown) until it reaches a temperature sufficient to substantially maintain said temperature during the coating operation. In practice, it has been found that when black steel drums are to be coated with a polyethylene powder, it is desirable to keep the temperature above 400° F.; and, to accomplish a reasonably well sustained heat, it has been found that an oven temperature of 500° F. will maintain a body heat of approximately 425°–450° F. during the movement of the drum from the oven to the apparatus of the present invention, and during the coating operation.

The heated drum body 80 is placed on carriage 50, which has been moved to the left in the position shown in phantom in FIGURE 1, clear of screen member 10, and is seated on rollers 57 and 58 of carriage 50, substantially in the position shown in phantom lines in FIGURE 1, with lip 81 disposed in second trough 90.

A quantity of resinous or metallic power is placed in hopper 40, and, aided by vibration, said powder will flow into the interior of screen member 10. Carriage 50 is then moved to the right-hand position shown in FIGURE 1, until drum 80 surrounds screen member 10.

To aid in the movement of carriage 50 to and from the left and right positions shown in FIGURE 1, if desired, a hydraulic cylinder 100 may be mounted on bed frame 11, said cylinder 100 having a piston rod 101 extending therefrom and suitably connected to carriage 50 so as to accomplish movement of carriage 50 toward and away from screen member 10 by adjustment of hydraulic pressure in cylinder 100. Cylinder 100 may be supported on bed frame 11 by a block 102 having a bore in which piston rod 101 is slidably disposed.

To assure a complete coating of the entire interior surface of drum 80, it has been found advantageous to so construct screen member 10 that the open mesh screen portion 12 thereof extends beyond the open ends of drum 80 a suitable distance when drum 80 is in position to be coated. By way of illustration, and not by way of limitation, it has been found desirable, when coating 55 gallon drums, to have open meshed screen 12 extend approximately three to four inches beyond each end of drum 80.

When drum 80 is in coating position, with screen member 10 disposed substantially coaxially therewith, and with lip 81 disposed in second trough 90, motor 30 is activated to rotate screen member 10, and motor 60 is activated to rotate drum 80. As screen member 10 is rotated, a quantity of the powder discharged therefrom will fall into second trough 90 and come in contact with lip 81.

In testing operations it has been found immaterial whether screen member 10 and drum 80 are rotated in the same or in opposite directions. Nor are the speeds of rotation of screen member 10 or drum 80 critical. However, by way of illustration, and again not by way of limitation, it has been found that if a screen member 10 having an eight inch diameter is used, a rate of rotation of screen member 10 from 45 to 50 r.p.m. gives satisfactory results, and various speeds of rotation of the drum 80 have been used, but a rate of rotation of between 40 and 50 r.p.m. of the drum 80 produces satisfactory results.

When screen member 10 is rotated, powder from hopper 40, aided by the truncated cone configuration of open end 14 of screen member 10, will be dispersed throughout the entire length of screen member 10. As the rotation of screen member 10 continues, particles of said powder will sift out through open-meshed screen 12, and will be deposited in a substantially even layer over the entire inside surface of drum 80. Any excess powder will drop into trough 72, where it is collected for re-use in subsequent operations.

On contact with the rotating heated body of drum 80, the particles of powder sifted from screen 12 will soften, flow and coalesce into one continuous mass, forming a strongly bonded coating on the interior surface of drum 80. Meanwhile, powder in second trough 90, on contact with heated lip 81, will also soften, flow and coalesce into a mass to form a similarly strongly bonded coating over the entire exposed surface of lip 81.

It will be understood that the method and apparatus of the present invention are principally concerned with coating the interior surfaces (and in connection with lipped bodies, such as steel shipping containers or drums, the lips) of open-ended cylindrical bodies. If heads and bottoms are thereafter to be installed on said bodies, said heads and bottoms are separately treated prior to installation by a separate method and apparatus, not a part of the present invention.

Although the operation as hereinabove described produces a substantially uniform coating of substantial thickness over the entire interior surface of the drum 80, as well as the entire exposed surface of lip 81, clear of voids, it has been found advantageous, though not essential, to post-heat the coated drum to form a more uniform coating. A satisfactory post-heat cycle for coatings formed of powders such as polyethylene has been found to be nine minutes, with an oven setting of approximately 390° F., although the time and temperature of post-heating is not critical.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures and methods.

What is claimed is:

1. Apparatus for applying a particulate material to the concave surface of an arcuate, heated body which comprises: a bed frame member; a cylindrical perforate member rotatably supported on said bed frame member and adapted to receive and retain said particulate material and to discharge said material therefrom by gravity when said perforate member is rotated; means for placing said concave surface in spaced juxtaposition to said perforate member prior to discharge of said particulate material from said perforate member; means for retaining said concave surface in fixed spaced juxtaposition to said perforate member while said particulate material is being discharged from said perforate member; and means on said bed frame for rotating said arcuate heated body about said perforate member while said particulate material is being discharged from said perforate member, whereby said discharged particulate material is deposited by gravity over the entire concave surface of said heated body.

2. Apparatus as defined in claim 1, wherein said rotatable perforate cylinder has an open end and a closed end; and wherein said cylinder is rotatably mounted on said bed frame adjacent the open end of said cylinder.

3. Apparatus as defined in claim 2, including a source of supply of said particulate material having access by gravity flow to the open end of said cylinder.

4. Apparatus as defined in claim 3, including means adjacent the open end of said cylinder for receiving and dispersing said particulate material substantially evenly throughout substantially the entire length of said cylinder.

5. Apparatus for applying a particulate material to an open-ended, cylindrical heated body so as to form a coating on the inner surface of said body which comprises: a bed frame; a rotatable perforate cylinder having a closed end and an open end, and mounted adjacent the open end of said cylinder in suspended, substantially parallel position above said bed frame; means adjacent the open end of said cylinder for introducing particulate material by gravity flow into said cylinder; means for placing said heated body in circumferential spaced relationship to said cylinder prior to discharge of said particulate material from said cylinder, with the ends of said cylinder projecting beyond the open ends of said body, means for retaining said heated body in said circumferential spaced relationship to said cylinder while said particulate material is being discharged from said cylinder and deposited on said heated body by gravity; means on said bed frame for rotating said heated body about said cylinder while said particulate material is being deposited on said heated body, whereby particulate material discharged from said cylinder, when rotated, will be deposited on the inner surface of said heated body so as to form a substantially uniform coating thereon; a trough suspended on said bed frame below said cylinder so as to receive excess particulate material discharged from said cylinder; and a second trough mounted on said bed frame, said second trough being adapted to receive a quantity of said particulate material and to receive an end of said heated body, so as to immerse said end in said particulate material and form an external coating on said end integral with the coating deposited on the inner surface of said body upon rotation of said body.

6. Apparatus as defined in claim 5, including means on said bed frame for moving said heated body into and out of circumferential, spaced relationship with said cylinder, which means comprises a roller carriage supported on said bed frame, said roller carriage supporting said heated body.

7. The method of applying a particulate material to the inner surface of an open-ended arcuate body which comprises the steps of: heating the body; substantially disposed a particulate material in a perforate cylindrical body by gravity flow; placing said heated body in juxtaposition to said perforate body; rotating said heated body circumferentially about said perforate body; and rotating said perforate body so as to discharge said particulate material by gravity from said perforate body and deposit said particulate material on the entire inner surface of said heated body.

8. The method of claim 7 including the step of postheating said arcuate body after removal of said arcuate body from juxtaposition with said perforate body.

References Cited by the Examiner
UNITED STATES PATENTS

| 2,737,461 | 3/1956 | Heisler et al. | 117—21 X |
| 3,016,875 | 1/1962 | Ballentine et al. | 117—18 X |
| 3,034,729 | 5/1962 | Gray et al. | 118—306 X |
| 3,044,893 | 7/1962 | Heintz et al. | |

FOREIGN PATENTS

| 239,598 | 9/1925 | Great Britain. |

RICHARD D. NEVIUS, *Primary Examiner.*
JOSEPH B. SPENCER, *Examiner.*